United States Patent Office 3,049,498
Patented Aug. 14, 1962

3,049,498
AGENT FOR GELLING ORGANIC LIQUIDS AND ORGANIC LIQUIDS GELLED THEREWITH
Edgar W. Sawyer, Jr., Metuchen, N.J., assignor to Minerals & Chemicals Philipp Corporation, Menlo Park, N.J., a corporation of Maryland
No Drawing. Filed May 16, 1961, Ser. No. 110,350
6 Claims. (Cl. 252—316)

The subject invention relates to the gelation of organic liquids with clay and relates, especially, to a novel composition of matter comprising a specific type of colloidal clay and fatty acid alkanolamide, useful in gelling a wide variety of organic liquids. This application is a continuation-in-part of my copending application 791,807, filed February 9, 1959, now abandoned.

Several recently developed methods for producing thickened lubricants and other organic liquids depend on the utilization of clays as the bodying agents in lieu of the fatty acid soaps customarily used for the purpose. Greases bodied with clays possess certain advantages over soap bodied greases, principally in their ability to withstand high temperature without loss of body. Exemplary of clay bodied greases or clay bodied organic liquids are those which involve the use of certain clays having adsorbed on their surfaces cationic hydrophobic surface active agents containing trivalent nitrogen atoms, e.g., hydrophobic aliphatic amines. Greases and other gelled organic liquids may also be prepared using onium clays in which exchangeable inorganic cations of the clay are exchanged for the cation of an onium compound to produce an organophilic onium-clay reaction product. A form of this procedure for treating clay is described in U.S. 2,623,852 to Peterson, where suitable clay is base exchanged with a salt of a higher fatty acid partial amide of a condensation product of a material such as epichlorohydrin and ammonia.

With few exceptions, the prior art clay bodied greases or other gelled organic liquid formulations formulated with cationic agents, are not entirely satisfactory for several reasons. Firstly, the surface active agents are relatively costly and bring the cost of the finished lubricant or the like up to a prohibitive level. Further, it is difficult to disperse the clay in the organic liquid and large quantities of clay and/or clay dispersing agent are necessary to thicken the liquid. Also, with few exceptions, such formulations are sensitive to the presence of water and tend to lose their stability upon introduction of water therein.

It has also been suggested, U.S. 2,971,922 to Clem, to coat suitable clay with certain fatty acid amides (or fatty acid amides derived from the fatty acid by reaction with organic diamines) to render clay oleophilic and suitable for thickening nonpolar organic liquids such as hydrocarbons, fuels and oils. The preferred method for coating clay crystals, as taught by Clem, is to agitate dry colloidal clay with molten amide. Alternatively, a solution of the oil-soluble amide may be mixed with colloidal clay and the solvent evaporated. The quantity of amide required to render the clay organophilic is relatively large, the amide constituting from 43% to 300%, and preferably about 100%, based on the weight of the clay.

It is an object of this invention to provide novel versatile colloidal clay products.

A further object of this invention is to provide a clay gelling agent for organic liquids which contains only small quantities of an inexpensive organic surface active agent.

A further object of this invention is to coat colloidal clay with an amide of such a character that small quantities may be uniformly coated on individual colloidal clay particles in the production of a gelling agent from such clay.

Another object of this invention is to utilize physical and chemical characteristics inherent in certain colloidal clay to facilitate the uniform coating of such clay with an organic amide.

Still another object of this invention is to provide clay gelled organic liquids.

Other objects and advantages of this invention will be readily apparent.

I have discovered that a wide variety of organic liquids may be stably gelled with small quantities of certain moisture-containing colloidal clay, hereafter described, and limited quantities of water-dispersible fatty acid alkanolamides.

Briefly stated, the novel gelling agent of this invention comprises a crystalline nonswelling clay selected from the group consisting of colloidal attapulgite clay and colloidal alpha sepiolite clay, which clay has never been dried below a free moisture (F.M.) of about 7% by weight (and therefore containing substantial loosely held water), the particles of said clay being uniformly coated with from about 15% to about 50%, and preferably 20% to 40% based on the moisture free weight of said clay, of at least one water-dispersible fatty acid alkanolamide of the following structural formula:

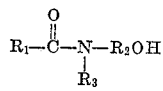

wherein: $R_1$ is selected from the group consisting of alkyl and alkenyl groups having from 7 to 17 carbon atoms; $R_2$ is an alkylene group having from 2 to 4 carbon atoms; and $R_3$ is selected from the group consisting of hydrogen, alkyl and alkanol groups having from 2 to 4 carbon atoms.

The clay gelling agent of this invention is made by thoroughly mixing the moisture-containing colloidal clay and water-dispersible fatty acid alkanolamide, preferably in the presence of water, and drying the mixture at a relatively low temperature, below the decomposition temperature of the amide and insufficient to impair the colloidal properties of the clay, for a time sufficient to reduce the free moisture of the mixture to an amount within the range of 7% to about 25%, based on the weight of the clay therein.

The term "free moisture" content, or F.M., as used herein, refers to the weight percentage of a material eliminated by heating the material to essentially constant weight at 220° F. The term "free moisture" is distinct from "volatile matter," or V.M., which refers to the weight percentage of clay eliminated by heating the clay to essentially constant weight at 1800° F. The moisture free (M.F.) weight of clay is the weight of the clay after being heated to essentially constant weight at 220° F. In the case of clay per se, water accounts substantially completely for the volatile matter and free moisture.

The hydrous fatty acid alkanolamide coated clay of this invention is useful in gelling a variety of organic liquids, polar and nonpolar. Gelation is realized by agitating, preferably with high shear, a mixture of coated clay and organic liquid so as to disperse the clay in the liquid. No heat is required to obtain the desired gelled structure and in most instances heat will impair the gel structure if sufficient to reduce the free moisture content of the clay below about the 7% level.

It will be noted that I employ proportions of fatty acid alkanolamide relative to clay which are very small as compared with quantities of amides heretofore suggested for use with clay in the production of agents for gelling organic liquids. In fact, an accompanying example will show that ratios of fatty acid alkanolamide to clay, such as are required with prior art amides, are ineffectual in gelling organic liquids which are very effectively gelled when the proportion of amide to clay is reduced.

Still, in accordance with this invention, organic liquids of the type mentioned hereafter are gelled by dispersing separately therein colloidal attapulgite or sepiolite clay containing native free moisture and water-dispersible fatty acid alkanolamide. Any order of addition of ingredients will suffice. Proportions of ingredients are those mentioned above as being suitable when using precoated clay since in this instance, as when using precoated clay, excess fatty acid alkanolamide impairs or prevents gelation of the organic liquid. In practicing this form of my invention, the colloidal clay must be one which has never been dried to a F.M. below 7%, and is preferably clay which has a F.M. between about 10% and 25%. It is believed that when organic liquids are gelled in this manner, the clay particles are coated with fatty acid alkanolamide in the presence of the organic liquid.

As mentioned, the clays I use in carrying out this invention are attapulgite and alpha sepiolite, which are unique clay minerals. Unlike most clay minerals which are composed of sheets, or stacks of sheets, these minerals consist of colloidally dimensioned needlelike crystal particles. Raw clay (which ordinarily has a free moisture content of 35% to 50% or higher), after suitable grinding and crushing, is particularly suitable for use in the preparation of the gelling agent. If desired, the clay may be degritted by means well known to those skilled in the art. Such practice is indicated when the gellant is intended for use in a lubricating grease. Although, as hereinabove mentioned, the free moisture content of the clay used in preparing the gellant is usually 35% to 50% or higher, there is no upper limit to the free moisture content of the starting clay I employ other than that dictated by the adverse economics of transporting very moist clay. I may use clay having a free moisture content as low as 10%. However, clays which have been dried to a free moisture content below about 7% are not suitable since the clay particles draw togther irreversibly during drying to such low moisture contents and the amide cannot be satisfactorily distributed on the surface of the clay particles.

The quantity of fatty acid amide in my hydrous coated clay product is limited to an amount within the range of about 15% to 50% of the moisture free clay weight, it having been found that when present in excess of about 50% the desired gelation of organic liquids is not realized or is seriously impaired. On the other hand, when used in amount less than 15%, the amide loses much of its effectiveness in promoting gelation with the clay. Especially where heavily bodied gels are desired, from 20% to 30% amide, based on the M.F. (moisture free) clay weight, is recommended.

The hydrotropic fatty acid alkanolamides I employ are described in Schwartz-Perry's "Surface Active Agents," pp. 212–213 (1949), and are produced by mixing 1 mol of fatty acid with 1 to 2 mols of alkanolamine and condensing the mixture at a temperature below the decomposition temperature of the resulting hydrotropic material. Diethanolamine is most frequently used in the process but other alkanolamines, such as monoethanolamine and mixtures thereof may be used, as well as isopropanolamine, etc. The fatty acids generally commercially used in producing these amides are derived from naturally occurring animal and vegetable triglyceride oils and fats, sometimes hydrogenated. As examples of suitable fatty acids are stearic acid, oleic acid, palmitic acid, linoleic acid, lauric acid, myristic acid and coconut oil fatty acids, the latter acid being most frequently employed.

Typical species of hydrotropic fatty acid alkanolamides useful in carrying out this invention are oleic acid diethanolamide, coconut fatty acid diethanolamide, stearic acid monoethanolamide and lauric acid diethanolamide.

In the preparation of the coated clay product of my invention, I preferably employ an extrusion method which involves the initial step of blending clay and amide together with water sufficient to provide a mix of extrudable consistency. This step may be carried out in any suitable apparatus, typically a pug mill. The amount of water I employ will depend, inter alia, on the free moisture content of the clay and will generally be sufficient to provide a mixture having a F.M. within the range of about 50% to 55%, based on the clay weight. I then extrude the resultant mixture in an auger extruder through an orifice, dry the extruded material under conditions at which the product temperature does not exceed about 205° F. to a free moisture content (based on the clay weight) within the range of about 10% to about 25%. The dried extrudate is then ground typically to −325 mesh. Normally, the free moisture of the alkanolamide coated clay is reduced somewhat during grinding and the free moisture of the ground coated clay product should be no less than about 7%, and preferably 12% to 20%, based on the clay weight. As will be shown in the examples which follow, fatty acid alkanolamide coated clay dried to a free moisture less than about 7%, based on the clay weight, does not produce a gel when dispersed in organic liquids. Any upper limit of free moisture content of the modified clay is dictated principally by the difficulty of grinding material having a free moisture content greater than about 25%.

As examples of liquids which have been gelled with success with my alkanolamide coated moisture-containing clay may be cited petroleum oil, mineral spirits, ethanol and lower aliphatic chlorohydrocarbon solvents such as methylene chloride. Gelled hydrocarbon liquids are useful as greases, mastics, etc.; gelled solvents are useful as paint strippers. The degree of shear or agitation that is required to gel any particular liquid with my gelling agent is best determined experimentally. As examples of suitable equipment for the purpose may be cited homogenizers, colloid mills, kinetic energy mills, gear pumps and other high speed mixers. The coated clay is useful also in producing waterless green molding sands with paraffinic or naphthenic oils as the tempering agent. In producing such molding sands, the coated clay, oil and sand are mulled as in producing conventional water tempered sands.

The quantity of the improved gellant that is used in gelling organic liquids will depend to a great extent on the nature of the liquid as well as the desired consistency of the ultimate product and the degree of shear that is used in dispersing the gellant in the organic liquid. In general, it may be said that if a low consistency gel is to be formulated, I employ a relatively small amount of gellant, typically 5% to 10%. However, when a heavily bodied gel is desired, I use a larger quantity of modified clay, such as 11% or more. Ordinarily, the amount of gellant I employ will be within the range of about 5% to 20%, based on the total weight of the formulation.

Another important use of the gellant of my invention is in the preparation of waterless or low-water content foundry sands. I have found that green sands prepared with my novel gellant in combination with a hydrocarbon oil as the binder have outstanding green strength and produce accurate castings. Only small amounts of the gellant need be used in the preparation of the sand, e.g., at least about 3 parts by weight of gellant (and usually about 5 parts by weight), 3 to 4 parts by weight of hydrocarbon oil and 100 parts by weight of sand.

The following examples are given for illustrative purposes.

EXAMPLE I 400 parts by weight of raw attapulgite clay mined near Attapulgus, Georgia, crushed to fineness of 2 to 4 mesh, and having a V.M. of 50% and a F.M. of about 44% were mixed with 40 parts by weight of lauric acid monoethanolamide. Four parts by weight of water were added to make the mix extrudable and the mixture extruded in an auger extruder. The extrudate was dried to a F.M. content of 15% in a rotary dryer under conditions such that the product temperature did not exceed 205° F. The dried material was ground through a corrugated mill and reground through a micropulverizer to a fineness of essentially −325 mesh. The F.M. of the pulverized product was found to be 13%, indicating the composition of the product was as follows.

|  | Parts by weight | Percent composition |
|---|---|---|
| M.F. attapulgite clay | [1] 225 | 74 |
| F.M. | 40 | 13 |
| Lauric acid monoethanolamide | 40 | 13 |
| Percent lauric acid monoethanolamide, based on M.F. clay |  | 19 |

[1] 200 parts by weight V.F. clay and 25 parts by weight combined $H_2O$.

The ground modified clay was dispersed in various organic liquids by one pass through a Tri-Homo colloid mill at 10,000 r.p.m. and at a clearance of 0.002 inch. The gel characteristics of the resultant bodied liquids were evaluated with the results reported in Table I. Also reported in Table I are half cone penetration values which are determined by the method of Holten and Kibler, described in Analytic Chemistry, volume 22, page 1574 (1950).

TABLE I

| Liquid | Percent alkanolamide coated clay, based on total weight of composition | Gel character | Spatula worked penetration (½ cone) |
|---|---|---|---|
| Petroleum oil | 20 | Stiff gel | 95 |
| Do | 15 | do | 125 |
| Mineral spirits | 20 | do | 100 |
| Ethanol | 20 | Medium gel | 150 |

From an examination of the data given in Table I, it is apparent that good gels were produced by dispersing my gelling agents in polar and nonpolar organic liquids.

EXAMPLE II

*Preparation of Inorganic Gellant*

400 parts by weight of attapulgite clay, crushed to a fineness of 2–4 mesh, and having a V.M. of 50%, and an F.M. of about 44% were mixed with 40 parts by

|  | Parts by weight | Percent composition |
|---|---|---|
| M.F. attapulgite clay | [1] 225 | 77 |
| F.M. | 29½ | 10 |
| Oleic acid diethanolamide | 40 | 13 |
| Percent oleic acid diethanolamide, based on M.F. clay |  | 18 |

[1] 200 parts by weight V.F. clay and 25 parts by weight combined $H_2O$.

*Gelation of Methylene Chloride*

Fifteen parts by weight of the ground inorganic gellant were mixed with 85 parts by weight of technical methylene chloride and the mixture was passed into a Tri-Homo colloid mill at a rotor speed of 10,000 r.p.m. and a clearance of 0.002 inch to form a heavy gel which exhibited good stability on extended storage.

EXAMPLE III

Another gellant of my invention is prepared by quantitative substitution of Spanish sepiolite for the attapulgite clay in Example II.

EXAMPLE IV

This example illustrates the gelling of a variety of organic liquids by agitating the liquid with moist colloidal attapulgite clay and fatty acid alkanolamide, the clay and alkanolamide being incorporated separately.

Various amide to clay ratios were used to illustrate the necessity for limiting such ratio.

Processing was as follows:

*A. Gelation of Eureka M Oil To Make a Grease*

The quantities of Attagel 10, oleic acid diethanolamide and Eureka M oil reported below were mixed in a Tri-Homo mill (a type of colloid mill) for 10 minutes. Attagel 10 is a refined colloidal grade of attapulgite clay having a V.M. of about 35% and an F.M. of about 25%, as produced. The results are tabulated in Table II.

These data show that the clay to amide weight ratio had to be maintained above 3/1 ("as is" clay basis or 2.25/1 M.F. clay basis) in order to obtain a grease structure with oil, moist colloidal attapulgite clay and fatty acid alkanolamide. In other words, when the fatty acid alkanolamide was employed in an amount in excess of about 25% of the combined weight of the moist colloidal clay and amide, no gelation of the oil occurred. The data further show that optimum grease structure was obtained using the fatty acid alkanolamide in amount of only TABLE II.—GELATIN OF LUBRICATING OIL WITH COLLOIDAL ATTAPULGITE CLAY AND FATTY ACID DIETHANOLAMIDE

| Formulation | I | II | III | IV | V |
|---|---|---|---|---|---|
| Attagel 10, parts by weight | 585 [1] | 585 | 585 | 585 | 585. |
| Eureka M,[2] parts by weight | 2,122 | 3,220 | 3,269 | 3,298 | 3,318. |
| Oleic acid DEA, parts by weight | 293 | 195 | 146 | 117 | 97. |
| Ratio of clay ("as is")/amide | 2/1 | 3/1 | 4/1 | 5/1 | 6/1. |
| Ratio of M.F. clay/amide | 1.5/1 | 2.25/1 | 3/1 | 3.75/1 | 4.5/1. |
| Percent amide, based on weight of clay and amide | 33 | 25 | 20 | 17 | 14. |
| Percent amide, based on M.F. clay weight | 66 | 45 | 33 | 26½ | 22. |
| Consistency of resultant gel | Essentially unthickened | Light gel | Med. gel | Thick greases | Thick greases. |

[1] 440 parts M.F. clay, 145 parts F.M.
[2] A hydrocarbon oil, 1,000 S.U.S. at 100° F.; V.I. 85.

weight of oleic acid diethanolamide having a free fatty acid content of about 1% and less than 1% free amine. Four parts by weight of water were added to make the mix extrudable and the mixture extruded in an auger extruder. The extrudate was dried as in Example I to a F.M. content of 12% and the dried material was ground through a hammer mill and reground through a micropulverizer to a fineness of −325 mesh. The F.M. of the final product was found to be 10%, indicating the following composition:

about 22% to 26%, based on the moisture free weight of the colloidal clay.

*B. Gelation of Cellosolve Acetate With Colloidal Attapulgite Clay and Oleic Acid Monoethanolamide (To Make a Gelled Plasticizer)*

Attempts were made to gel Cellosolve acetate with Attagel 30 and oleic acid monoethanolamide. These ingredients in the quantities reported in Table III were agitated in a Waring Blendor operated at high speed for about 10 minutes. Attagel 30 is a refined grade of colloidal attapulgite clay having a V.M. of 25% and an F.M. of 10% (as produced).

TABLE III.—GELATION OF CELLOSOLVE ACETATE WITH COLLOIDAL ATTAPULGITE CLAY AND OLEIC ACID MONOETHANOLAMIDE

| Formulation | I | II | III |
|---|---|---|---|
| Attagel 30, parts by weight | [1] 15 | 15 | 15 |
| Cello. Ac., parts by weight | 77½ | 80 | 82 |
| Oleic acid MEA, parts by weight | 7½ | 5 | 3 |
| "As is" clay/amide ratio | 2/1 | 3/1 | 5/1 |
| M.F. clay/amide ratio | 1.8/1 | 2.7/1 | 4.5/1 |
| Percent amide, based on M.F. clay | 55 | 36 | 21 |
| Consistency of resultant gel | Very thin | Medium | Thick |

[1] 13.5 parts by weight M.F. clay, 1.5 parts by weight F.M.

As in Example IVA, these data show that a moist clay to amide ratio of only 2/1 was insufficient to gel the organic liquid. By decreasing the quantity of amide to 21% to 36% of the moisture free clay weight, gelation was realized with optimum results being obtained using only 21% amide.

C. *Gelation of Eureka M Oil, Colloidal Attapulgite Clay and Oleic Acid Monoethanolamide*

Attagel 20 (colloidal attapulgite clay having V.M. of about 25%, F.M. of about 10%, as produced) was mixed with various quantities of oleic acid monoethanolamide and Eureka M oil (using a higher oil/clay ratio than in Example IVA) with the results tabulated in Table IV. A Morehouse mill was used in dispersing the clay in the oil.

TABLE IV

| Formulation | I | II | III |
|---|---|---|---|
| Attagel 20, parts by weight | [1] 10 | 10 | 10 |
| Eureak M oil, parts by weight | 87½ | 86⅔ | 85 |
| Oleic acid MEA | 2½ | 3⅓ | 5 |
| "As is" clay/amide ratio | 4/1 | 3/1 | 2/1 |
| M.F. clay/amide ratio | 3.6/1 | 2.6/1 | 1.8/1 |
| Percent amide, based on amide and clay | 20 | 24 | 33⅓ |
| Percent amide, based on M.F. clay | 28 | 37 | 56 |
| Results | Grease | Heavy gel | V. Light gel |

[1] 9 parts by weight M.F. clay, 1 part by weight F.M.

The results reported in Table IV show that as the proportion of amide to clay increased from 20% to 33⅓% of the combined amide and clay content, the gel consistency of the clay thickened liquid dropped sharply. Optimum thickening was obtained using amide in amount of 28% of the moisture free clay weight.

D. *Gelation of White Mineral Oil With Colloidal Attapulgite Clay and Lauric Acid Monoethanolamide*

Various proportions of Attagel 20, lauric acid monoethanolamide and light white mineral oil were agitated at room temperature in a Cowles dissolver, with the results reported in Table V.

TABLE V

| Formulation | I | II | III |
|---|---|---|---|
| Attagel 20, parts by weight | [1] 20 | 20 | 20 |
| Mineral oil, parts by weight | 76 | 75 | 70 |
| Lauric acid MEA, parts by weight | 4 | 5 | 10 |
| "As is" clay/amide ratio | 5/1 | 4/1 | 2/1 |
| Percent amide, based on amide and clay | 16½ | 20 | 33⅓ |
| Percent amide, based on M.F. clay | 22 | 28 | 56 |
| Results | Thick gel | Med. gel | Thin liq. |

[1] 18 parts by weight M.F. clay, 2 parts by weight F.M.

The data in Table V show that with amide used in amount of 56% of the moisture free weight of the colloidal attapulgite clay, no gelation of the mineral oil occurred; when the proportion of amide was reduced by 50% or more, a thick gel was obtained.

EXAMPLE V

Experiments were conducted to demonstrate the necessity for maintaining an adequate free moisture content in colloidal clay coated with small amounts of fatty acid alkanolamide in order to obtain a material effective in gelling organic liquids.

Raw attapulgite clay (V.M. 50%, F.M. 44%) was pugged with water and lauric acid monoethanolamide in amount of 13% by weight (17% based on the weight of the clay, 20% V.M. clay basis) and extruded as in Example I. The extrudate was divided in several portions, each of which was dried at a product temperature less than 205° F. to various F.M. contents and ground to minus 325 mesh. The F.M. of each sample of ground product was measured and the products were examined for gelling properties and sand binding properties, with the results summarized in Table VI.

These data show that the free moisture content of the alkanolamide coated clay must be at least about 7%, based on the weight of the clay, in order to gel organic liquids with attapulgite clay coated fatty acid alkanolamide. The data also indicate that optimum gelation is obtained when the F.M. of the coated clay is 12% or more, based on the clay weight. Similar results are obtained when the clay and fatty acid alkanolamide are added separately to the organic liquids in the production of the gelled organic liquids.

TABLE VI.—EFFECT OF FREE MOISTURE CONTENT ON GELLING CAPACITY OF FATTY ACID ALKANOLAMIDE COATED ATTAPULGITE CLAY [3]

| F.M., percent [1] | F.M., percent [2] | Waring Blendor dispersions | | Foundry sand formulations (100 parts #120 sand, 6 parts coated clay, 4 parts Eureka M oil) green compressive strength, [4] p.s.i. |
|---|---|---|---|---|
| | | 20 parts coated clay, 80 parts mineral spirits | 15 parts coated clay, 85 parts mineral oil | |
| | | Gel properties | | |
| (a) | (a) | No gel | No gel | 3.0 |
| 4 | 5.3 | ----do---- | ----do---- | 5.6 |
| 6 | 7.8 | Very slight gel | Medium gel | 10.0 |
| 8 | 10.2 | Medium gel | Heavy gel | 12.1 |
| 10 | 12.4 | Thick gel | ----do---- | 14.3 |
| 15 | 17.5 | ----do---- | ----do---- | 14.0 |
| 18 | 20.2 | ----do---- | ----do---- | 12.4 |

(a) Negligible.
[1] Based on total weight of clay plus amide.
[2] Based on weight of clay alone.
[3] Amide used in amount of 17% by weight clay (20% V.M. clay basis).
[4] Sands sampled by method described in Section 3, page 12 "Foundry Sand Handbook" (1952) and tested by method described in Section 8 "Foundry Sand Handbook" (1952) using machine shown in photograph 36, specimen rammed 3 times in each test.

I claim:
1. An agent for gelling organic liquids consisting essentially of clay selected from the group consisting of colloidal attapulgite clay and colloidal sepiolite clay which has never been dried to a F.M. below about 7%, the particles of said clay being uniformly coated with from about 15% to about 50%, based on the moisture free weight of said clay of at least one water-dispersible fatty acid alkanolamide of the following structural formula:

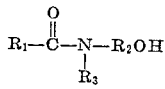

wherein: $R_1$ is selected from the group consisting of alkyl and alkenyl groups having from 7 to 17 carbon atoms; $R_2$ is an alkylene group having from 2 to 4 carbon atoms; and $R_3$ is selected from the group consisting of hydrogen, alkyl and alkanol groups having from 2 to 4 carbon atoms.

2. An agent for gelling organic liquids consisting essentially of colloidal attapulgite clay which has never been dried to a F.M. below about 7% and has a F.M. not to exceed about 25%, the particles of said clay being uniformly coated with from about 20% to about 40%, based on the moisture free weight of said clay of at least one water-dispersible fatty acid alkanolamide of the following structural formula:

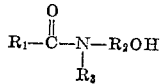

wherein: $R_1$ is selected from the group consisting of alkyl and alkenyl groups having from 7 to 17 carbon atoms; $R_2$ is an alkylene group having from 2 to 4 carbon atoms; and $R_3$ is selected from the group consisting of hydrogen, alkyl and alkanol groups having from 2 to 4 carbon atoms.

3. Attapulgite clay which has never been dried to a F.M. below about 7%, the particles of clay containing from about 12% to about 20% by weight of free moisture and from about 20% to 40%, based on the moisture free weight of said clay of at least one water-dispersible fatty acid alkanolamide of the following structural formula:

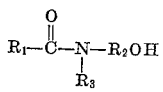

wherein: $R_1$ is selected from the group consisting of alkyl and alkenyl groups having from 7 to 17 carbon atoms; $R_2$ is an alkylene group having from 2 to 4 carbon atoms; and $R_3$ is selected from the group consisting of hydrogen, alkyl and alkanol groups having from 2 to 4 carbon atoms.

4. A method of producing an agent for gelling organic liquids which comprises mixing a colloidal clay selected from the group consisting of attapulgite clay and sepiolite clay with water and from about 15% to 50%, based on the moisture free weight of said clay of at least one water-dispersible fatty acid alkanolamide of the following structural formula:

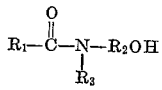

wherein: $R_1$ is selected from the group consisting of alkyl and alkenyl groups having from 7 to 17 carbon atoms; $R_2$ is an alkylene group having from 2 to 4 carbon atoms; and $R_3$ is selected from the group consisting of hydrogen, alkyl and alkanol groups having from 2 to 4 carbon atoms;
and drying said mixture at a product temperature not to exceed about 205° F. to a free moisture content of about 7% to about 25%, based on the weight of said clay.

5. A method of preparing an agent for gelling organic liquids which comprises mixing to apparent homogeneity colloidal attapulgite clay having a free moisture content of at least about 10%, with water sufficient to provide a mixture of extrudable consistency and from about 20% to 40%, based on the moisture free weight of said clay of at least one water-dispersible fatty acid alkanolamide of the following structural formula:

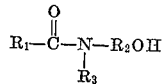

wherein: $R_1$ is selected from the group consisting of alkyl and alkenyl groups having from 7 to 17 carbon atoms; $R_2$ is an alkylene group having from 2 to 4 carbon atoms; and $R_3$ is selected from the group consisting of hydrogen, alkyl and alkanol groups having from 2 to 4 carbon atoms;
extruding the resultant mixture, and drying the resultant extrudate at a product temperature not to exceed about 205° F. to a free moisture content of from about 10% to 20%, based on the clay weight.

6. An organic liquid having dispersed therein from about 5% to about 20% by weight of a clay selected from the group consisting of colloidal attapulgite clay and colloidal sepiolite, said clay having a F.M. of about 7% to about 25% and never having been dried to a F.M. below about 7%, and from about 15% to about 50%, based on the moisture free weight of said clay, of at least one fatty acid alkanolamide of the following structural formula:

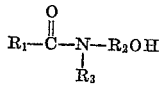

wherein: $R_1$ is selected from the group consisting of alkyl and alkenyl groups having from 7 to 17 carbon atoms; $R_2$ is an alkylene group having from 2 to 4 carbon atoms; and $R_3$ is selected from the group consisting of hydrogen, alkyl and alkanol groups having from 2 to 4 carbon atoms.

References Cited in the file of this patent
UNITED STATES PATENTS

| | | |
|---|---|---|
| 2,623,852 | Peterson | Dec. 30, 1952 |
| 2,971,922 | Clem | Feb. 14, 1961 |